United States Patent
Jung et al.

(10) Patent No.: US 10,089,901 B2
(45) Date of Patent: Oct. 2, 2018

(54) APPARATUS FOR BI-DIRECTIONAL SIGN LANGUAGE/SPEECH TRANSLATION IN REAL TIME AND METHOD

(71) Applicant: Electronics and Telecommunications Research Institute, Daejeon (KR)

(72) Inventors: Woo Sug Jung, Daejeon (KR); Hwa Suk Kim, Daejeon (KR); Jun Ki Jeon, Daejeon (KR); Sun Joong Kim, Sejong (KR); Hyun Woo Lee, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 51 days.

(21) Appl. No.: 15/188,099

(22) Filed: Jun. 21, 2016

(65) Prior Publication Data

US 2017/0236450 A1 Aug. 17, 2017

(30) Foreign Application Priority Data

Feb. 11, 2016 (KR) .................. 10-2016-0015726

(51) Int. Cl.
*G10L 15/26* (2006.01)
*G10L 21/06* (2013.01)
(Continued)

(52) U.S. Cl.
CPC ........... *G09B 21/009* (2013.01); *G06F 3/014* (2013.01); *G06F 3/017* (2013.01); *G06F 3/0304* (2013.01);
(Continued)

(58) Field of Classification Search
CPC ... G10L 15/26; G10L 21/06; G10L 2021/065; G06K 9/00355
(Continued)

(56) References Cited

U.S. PATENT DOCUMENTS 5,659,764 A * 8/1997 Sakiyama ............ G09B 21/009
340/4.13
5,953,693 A 9/1999 Sakiyama et al.
(Continued)

FOREIGN PATENT DOCUMENTS

JP 2003015810 A * 1/2003
KR 10-1130276 3/2012
(Continued)

OTHER PUBLICATIONS

Elliott, Ralph, et al. "Linguistic modelling and language-processing technologies for Avatar-based sign language presentation." Universal Access in the Information Society 6.4, Feb. 2008, pp. 375-391.*
(Continued)

*Primary Examiner* — James Wozniak
(74) *Attorney, Agent, or Firm* — Kile Park Reed & Houtteman PLLC

(57) ABSTRACT

Provided is an apparatus for bi-directional sign language/speech translation in real time and method that may automatically translate a sign into a speech or a speech into a sign in real time by separately performing an operation of recognizing a speech externally made through a microphone and outputting a sign corresponding to the speech, and an operation of recognizing a sign sensed through a camera and outputting a speech corresponding to the sign.

20 Claims, 5 Drawing Sheets

(51) Int. Cl.
  *G06K 9/00* (2006.01)
  *G09B 21/00* (2006.01)
  *G06F 3/01* (2006.01)
  *G06F 3/03* (2006.01)
  *G06F 3/16* (2006.01)
  *G06T 7/00* (2017.01)
  *G10L 13/027* (2013.01)

(52) U.S. Cl.
  CPC ............ *G06F 3/16* (2013.01); *G06K 9/00355* (2013.01); *G06T 7/0081* (2013.01); *G09B 21/00* (2013.01); *G10L 13/027* (2013.01); *G10L 15/26* (2013.01); *G10L 21/06* (2013.01); *G06T 2207/20144* (2013.01); *G10L 2021/065* (2013.01)

(58) Field of Classification Search
  USPC ........................................ 704/235, 251, 271
  See application file for complete search history.

(56) References Cited

U.S. PATENT DOCUMENTS

| | | | |
|---|---|---|---|
| 5,974,116 A | 10/1999 | Engelke et al. | |
| 6,377,925 B1 | 4/2002 | Greene, Jr. et al. | |
| 6,819,782 B1* | 11/2004 | Imagawa | G06K 9/00355 382/115 |
| 7,277,858 B1 | 10/2007 | Weaver et al. | |
| 7,676,372 B1* | 3/2010 | Oba | G09B 21/009 434/169 |
| 8,566,075 B1 | 10/2013 | Bruner | |
| 2004/0034522 A1* | 2/2004 | Liebermann | G06F 17/2872 704/2 |
| 2005/0033578 A1 | 2/2005 | Zuckerman | |
| 2006/0026001 A1 | 2/2006 | Bravin et al. | |
| 2006/0074624 A1 | 4/2006 | Sahashi | |
| 2008/0059578 A1* | 3/2008 | Albertson | G06F 3/016 709/204 |
| 2009/0254868 A1* | 10/2009 | Bokor | G06F 3/011 715/863 |
| 2009/0306981 A1* | 12/2009 | Cromack | G06F 17/30743 704/235 |
| 2010/0023314 A1* | 1/2010 | Hernandez-Rebollar | G06F 3/017 704/3 |
| 2010/0199228 A1* | 8/2010 | Latta | G06F 3/011 715/863 |
| 2010/0223046 A1 | 9/2010 | Bucchieri et al. | |
| 2011/0271895 A1 | 11/2011 | Park | |
| 2011/0289456 A1* | 11/2011 | Reville | G06F 3/017 715/830 |
| 2012/0078628 A1* | 3/2012 | Ghulman | G06F 3/14 704/235 |
| 2012/0215520 A1* | 8/2012 | Davis | G06F 17/289 704/3 |
| 2013/0160048 A1 | 6/2013 | Cho et al. | |
| 2013/0204605 A1 | 8/2013 | Illgner-Fehns | |
| 2014/0028538 A1* | 1/2014 | Shin | G06F 3/014 345/156 |
| 2014/0046661 A1* | 2/2014 | Bruner | H04N 21/4884 704/235 |
| 2014/0337023 A1* | 11/2014 | McCulloch | G06F 1/163 704/235 |
| 2015/0120293 A1* | 4/2015 | Wohlert | G10L 21/003 704/235 |
| 2015/0220512 A1* | 8/2015 | Heinemeyer | G10L 15/005 704/2 |
| 2015/0339520 A1* | 11/2015 | Yu | G06K 9/00355 382/103 |
| 2015/0379896 A1* | 12/2015 | Yang | G02B 27/017 434/112 |
| 2016/0062987 A1* | 3/2016 | Yapamanu | G10L 15/005 704/2 |
| 2016/0232403 A1* | 8/2016 | Mohandes | G06K 9/00355 |
| 2016/0306431 A1* | 10/2016 | Stafford | G06F 3/014 |
| 2016/0307469 A1* | 10/2016 | Zhou | G06F 3/014 |

FOREIGN PATENT DOCUMENTS

| | | |
|---|---|---|
| KR | 10-1151865 | 5/2012 |
| KR | 10-2015-0086902 | 7/2015 |

OTHER PUBLICATIONS

Hyun Suk Lee et al., "Development of Sign Language Translation System using Motion Recognition of Kinect"; Journal of the Institute of Signal Processing and Systems, Oct. 2013, vol. 14, No. 4, pp. 235-242.

Su Hyun Park et al., "Morpheme Conversion for Korean Text-to-Sign Language Translation System"; The Transactions of the Korea Information Processing Society, Mar. 1998, vol. 5, No. 3, pp. 688-702.

Byung-cheon Yoon; "An Alanystic Review of Research on Sign Language in Korea"; The Journal of Special Education: Theory and Practice, Mar. 2005, vol. 6, No. 1, pp. 19-36.

* cited by examiner

APPARATUS FOR BI-DIRECTIONAL SIGN LANGUAGE/SPEECH TRANSLATION IN REAL TIME AND METHOD

CROSS-REFERENCE TO RELATED APPLICATION(S)

This application claims the priority benefit of Korean Patent Application No. 10-2016-0015726, filed on Feb. 11, 2016, in the Korean Intellectual Property Office, the disclosure of which is incorporated herein by reference for all purposes.

BACKGROUND

1. Field

One or more example embodiments relate to an apparatus for bi-directional sign language/speech translation in real time and method, and more particularly, to an apparatus for bi-directional sign language/speech translation in real time and method that automatically translates from a sign to a speech or from a speech to a sign in real time to solve an issue of existing unidirectional or fragmentary sign language translation technology.

2. Description of Related Art

According to global estimates released by the World Health Organization (WHO), as of February, 2013, more than 360 million people in the world, which is greater than the population of the United States, have hard-hearing. Further, according to statistics of e-Nation Index, as of December, 2014, about a quarter of a million people have hard-hearing in Korea. Impairment by loss of physiological function, including hearing impairment, causes physiological and functional issues and serious issues in financial, social, and emotional aspects as well. An enormous social cost is required to solve above issues. Accordingly, media regulation organizations of all over the world start to deal with hearing impairment as an issue of fundamental human rights to improve such issues caused by hearing impairment, and provide three major types of services.

A subtitle service includes closed captioning (CC), subtitles for hard of hearing (HoH), and subtitles for deaf and hard of hearing (SDF) which all help a hearing-impaired person not to experience alienation in everyday life. The subtitle service is classified into two types, one that adds subtitles and dubbings in various languages to video contents, and the other that changes a speech into a real-time subtitle by a text interpreter and provides the real-time subtitle to a hearing-impaired person through a predetermined terminal via a server. The subtitle service may be applicable to broadcasts or performances where information is transferred in one direction, but may be difficult to apply to a service requiring bidirectional information exchange, such as everyday life. Further, the subtitle service provides pre-processed subtitle data for provided contents, and thus a real-time service may not be guaranteed.

A video relay service allows a hearing-impaired person to transfer sign language information via a sign language interpreter being connected through a voice over Internet protocol (VoIP) video call service, the sign language interpreter to transfer a speech to a person who is not hearing-impaired and also to provide the interpretation service in a reverse order. However, the video relay service has restrictions in that connection with the sign language interpreter over a network is needed to receive the service, and a relatively long time is required to translate a sign into a speech or a speech into a sign via the sign language interpreter, and thus is difficult to apply to everyday conversions.

A gesture-based sign language translation service is a technology that recognizes a sign, for example, gesture, of a hearing-impaired person and converts the sign into a speech, and changes a speech of a person who is not hearing-impaired into a sign, thereby alleviating an inconvenience of the hearing-impaired person. However, the gesture-based sign language translation may not provide simultaneous bidirectional sign-speech translation and situation-based sign language translation, and thus the speed and accuracy of sign language translation may decrease.

Accordingly, a method for real-time automatic speech-sign translation is provided herein to alleviate inconveniences that people with hard-hearing experience in everyday life.

SUMMARY

An aspect provides an apparatus for bi-directional sign language/speech translation in real time and method that may automatically translate a sign into a speech or a speech into a sign using a body-attached device, for example, smart glasses, to solve existing issues and alleviate an inconvenience of a hearing-impaired person in everyday life.

Another aspect also provides a gesture-based apparatus for bi-directional sign language/speech translation in real time and method that may translate a sign to a speech, translate a speech to a sign through a separate process, and collect/analyze location and surrounding environment information of a user, thereby improving the speed and accuracy of sign language translation.

According to an aspect, there is provided an apparatus for bi-directional sign language/speech translation in real time including a pattern analyzer configured to analyze a used pattern of sign language by user, a speech-sign outputter configured to recognize a speech externally made through a microphone and output a sign corresponding to the speech, and a sign-speech outputter configured to recognize a sign sensed through a camera and output a speech corresponding to the sign.

The speech-sign outputter may include a speech recognizer configured to recognize the speech through the microphone and remove noise from the speech, an index generator configured to generate a sign index to translate into a sign corresponding to the noise-removed speech, and a sign outputter configured to output the sign corresponding to the speech based on the generated sign index.

The index generator may include a speech-text converter configured to convert the recognized speech into a text using a predefined sign language dictionary, and an index determiner configured to determine a sign index with respect to the text based on the text and the used pattern of sign language by the user.

The pattern analyzer may be configured to analyze the used pattern of sign language by the user by analyzing at least one of location information of the user, surrounding environment information of the user corresponding to the location information, a life pattern of the user, or a behavior pattern of the user.

The sign outputter may include a display mode controller configured to control an output based on a display mode to display one of a sign and a text corresponding to the recognized speech, and an outputter configured to output a sign mapped to the generated sign index or a text corresponding to the sign mapped to the generated sign index based on the display mode.

The display mode controller may be configured to control the display mode of the outputter based on a sign display event or a generation period of the sign mapped to the sign index.

The outputter may be configured to synchronize a sign or a text to the sign index based on information transferred based on the display mode and output the synchronized sign or text on a display of the apparatus for bi-directional sign language/speech translation in real time.

The sign-speech outputter may include a sign recognizer configured to recognize the sign sensed through the camera, an index generator configured to generate a sign index to translate into the speech corresponding to the recognized sign, and a speech outputter configured to output the speech corresponding to the sign based on the generated sign index.

The sign recognizer may include a wearing sensor configured to sense whether the user is wearing gesture gloves, and a sign collector configured to collect the sign based on whether the user is wearing the gesture gloves.

The sign collector may be configured to collect the sign by removing a background from a color image acquired by the camera when the user is not wearing the gesture gloves.

The sign collector may be configured to collect the sign based on a finger motion of the user collected from the camera when the user is wearing the gesture gloves.

The index generator may include an index determiner configured to determine the sign index with respect to the recognized sign using a predefined sign language dictionary, a sign-text converter configured to convert the recognized sign to a text based on the determined sign index, and a sentence generator configured to generate a sentence associated with the sign with respect to the text through a keyword combination corresponding to the text and the used pattern of sign language by the user.

The speech outputter may be configured to output a speech corresponding to the sentence associated with the sign with respect to the text.

According to another aspect, there is also provided a method for bi-directional sign language/speech translation in real time performed by an apparatus for bi-directional sign language/speech translation in real time, the method including analyzing a used pattern of sign language by user who uses the apparatus for bi-directional sign language/speech translation in real time, recognizing a sign or speech externally made by the user through a camera or a microphone, identifying the sign or speech of the user recognized through the camera or the microphone, and outputting a speech corresponding to the sign or a sign corresponding to the speech through a different translation path based on a result of the identifying.

The outputting may include removing noise from the speech when the speech of the user is identified, generating a sign index to translate into a sign corresponding to the recognized speech, and outputting the sign corresponding to the speech based on the generated sign index.

The generating may include converting the recognized speech into a text using a predefined sign language dictionary, and determining a sign index with respect to the text based on the text and the used pattern of sign language by the user.

The outputting of the sign corresponding to the speech may include controlling whether to display a sign or a text based on a display mode to display one of a sign and a text corresponding to the recognized speech, and outputting a sign mapped to the generated sign index or a text corresponding to the sign mapped to the generated sign index based on the display mode.

The outputting of the speech corresponding to the sign may include recognizing the sign when the sign of the user is identified, generating a sign index to translate into the speech corresponding to the recognized sign, and outputting the speech corresponding to the sign based on the generated sign index.

The recognizing may include sensing whether the user is wearing gesture gloves, and collecting the sign based on whether the user is wearing the gesture gloves.

The generating may include determining the sign index with respect to the recognized sign using a predefined sign language dictionary, converting the recognized sign to a text based on the determined sign index, and generating a sentence associated with the sign with respect to the text through a keyword combination corresponding to the text and the used pattern of sign language by the user.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
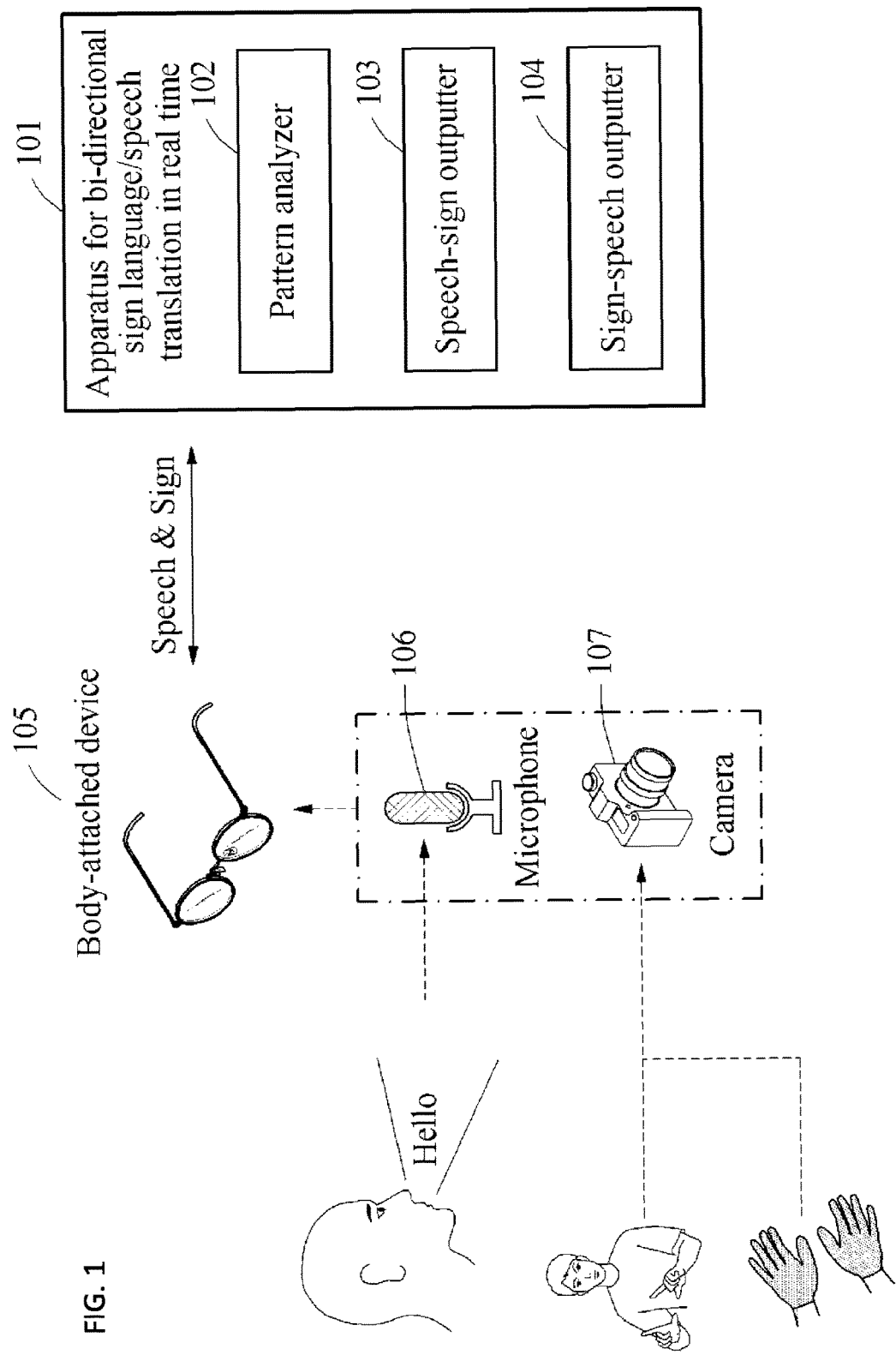
FIG. 1 is a diagram illustrating an apparatus for bi-directional sign language/speech translation in real time according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

FIG. 1 is a diagram illustrating an apparatus for bi-directional sign language/speech translation in real time according to an example embodiment.

Referring to FIG. 1, an apparatus 101 for bi-directional sign language/speech translation in real time may translate a speech into a sign or a sign into a speech in real time, and output a result of translation to provide a convenience to a user who uses a sign language. Here, the apparatus 101 for bi-directional sign language/speech translation in real time may be an apparatus to perform sign-speech translation with a head-mounted display (HMD). For example, the apparatus 101 for bi-directional sign language/speech translation in real time may include a smart terminal.

In detail, the apparatus 101 for bi-directional sign language/speech translation in real time may recognize a speech or sign externally made by a user through a microphone 106 or a camera 107. The apparatus 101 for bi-directional sign language/speech translation in real time may identify the recognized speech or sign of the user, and translate the speech into a sign or the sign into a speech based on a result of the identifying. In this example, the apparatus 101 for bi-directional sign language/speech translation in real time may perform translation through a different translation path based on the result of the identifying.

To achieve the foregoing, the apparatus 101 for bi-directional sign language/speech translation in real time may include a pattern analyzer 102, a speech-sign outputter 103, and a sign-speech outputter 104. When a speech of the user is recognized, the speech-sign outputter 103 may translate the speech into a sign, and output a result of translation, for example, the sign. Conversely, when a sign of the user is recognized, the sign-speech outputter 104 may translate the sign into a speech, and output a result of translation, for example, the speech. In detail, the apparatus 101 for bi-directional sign language/speech translation in real time may perform duplex translation from a speech into a sign or from a sign into a speech by separately performing a process of translating a speech into a sign and a process of translating a sign into a speech. The operation of translating a speech into a sign and the operation of translating a sign into a speech will be described in detail with reference to FIGS. 2 and 3, respectively.

The apparatus 101 for bi-directional sign language/speech translation in real time may use a body-attached device 105 to recognize the speech or sign externally made by the user. The apparatus 101 for bi-directional sign language/speech translation in real time may interoperate with the body-attached device 105, or operate in the body-attached device 105 depending on situations. In detail, the apparatus 101 for bi-directional sign language/speech translation in real time may be configured separately from the body-attached device 105 to translate a speech into a sign or a sign into a speech by interoperating with the body-attached device 105. In another example, the apparatus 101 for bi-directional sign language/speech translation in real time may be configured to be included in the body-attached device 105, in detail, to operate in the body-attached device 105, to translate a speech into a sign or a sign into a speech in real time.

The body-attached device 105 may include a microphone, a speaker, a display device, and a camera, and may be implemented in a wearable form to be attached to a body of the user. For example, the body-attached device 105 may be implemented as a device attachable to a body of the user, for example, an eyewear type device or a watch type device.

The pattern analyzer 102 may analyze a used pattern of sign language of the user to improve the accuracy and speed of real-time speech-sign or sign-speech translation. In detail, the pattern analyzer 102 may analyze the used pattern of sign language by the user. The used pattern of sign language by the user may include, for example, location information of the user, surrounding environment information of the user corresponding to the location information, a life pattern of the user, and a behavior pattern of the user. The apparatus 101 for bi-directional sign language/speech translation in real time may translate a speech or a sign based on the analyzed sign use pattern of the user, thereby minimizing unnecessary sign translation and improving the accuracy and speed of translation.

The apparatus 101 for bi-directional sign language/speech translation in real time may predict information to be used for sign-speech translation by analyzing the life pattern of the user and inputting/analyzing the location information and the surrounding environment information, thereby guaranteeing the accuracy of translation content and real-time sign-speech translation. A configuration for the foregoing will be described in detail with reference to FIG. 4.

The apparatus 101 for bi-directional sign language/speech translation in real time may perform duplex sign-speech and speech-sign translation in real time with the body-attached device 105 to solve an issue of unidirectional or fragmentary sign language translation technology.

Further, the apparatus 101 for bi-directional sign language/speech translation in real time may include a translation path for sign-speech translation and a translation path for speech-sign translation separately, thereby alleviating an inconvenience in the existing unidirectional or fragmentary sign language translation technology.

Figure 2:
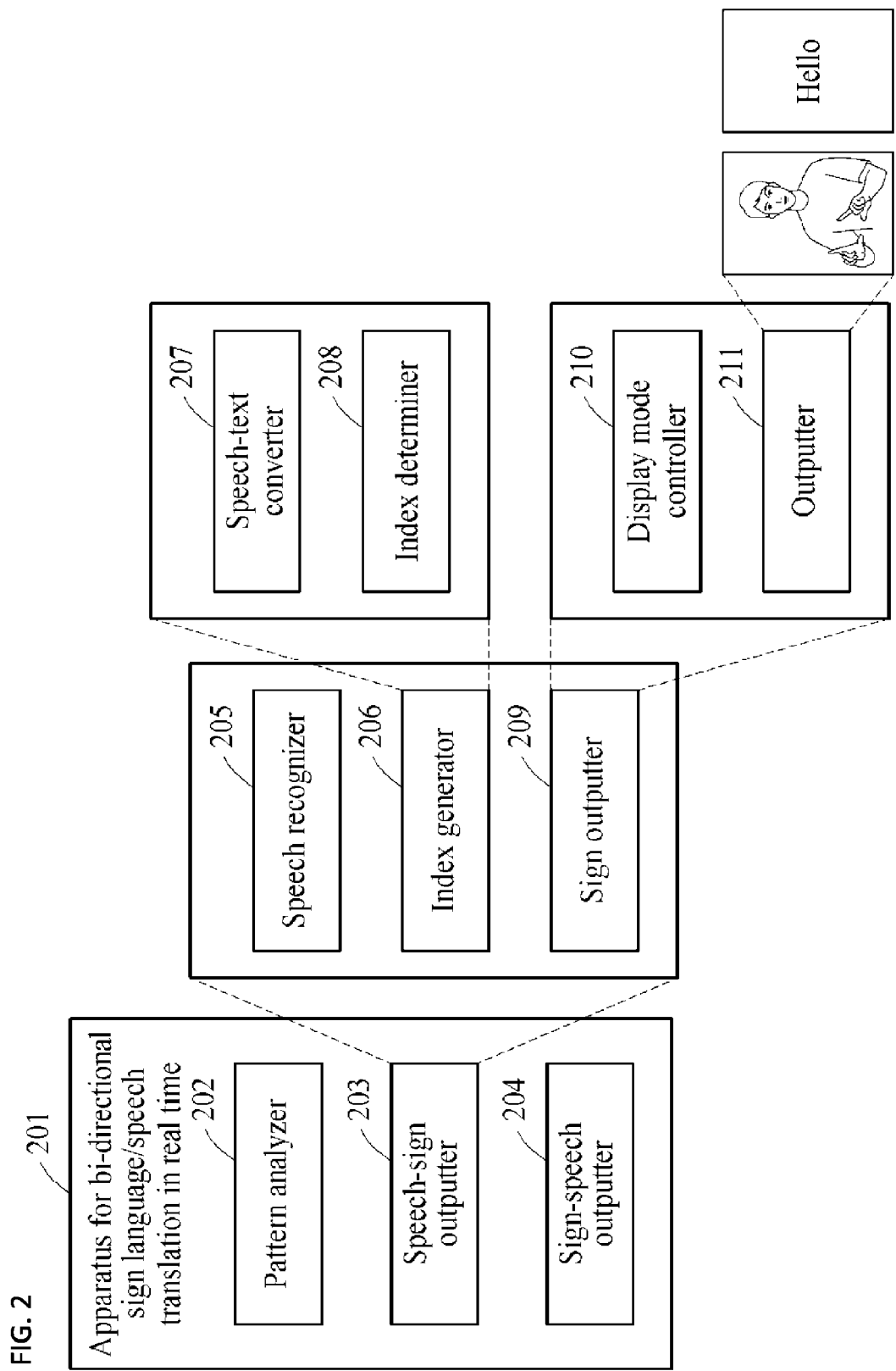
FIG. 2 is a block diagram illustrating a speech-sign outputter in an apparatus for bi-directional sign language/speech translation in real time according to an example embodiment.

FIG. 2 is a block diagram illustrating a speech-sign outputter in an apparatus for bi-directional sign language/speech translation in real time according to an example embodiment.

Referring to FIG. 2, an apparatus 201 for bi-directional sign language/speech translation in real time may include a pattern analyzer 202, a speech-sign outputter 203, and a sign-speech outputter 204. The speech-sign outputter 203 may translate a speech into a sign, and output a result of translation, for example, the sign. The sign-speech outputter 204 may translate a sign into a speech, and output a result of translation, for example, the speech. Hereinafter, a process of translating a speech into a sign and outputting a result of translation, for example, the sign, will be described in detail based on the speech-sign outputter 203.

In detail, the pattern analyzer 202 may analyze a used pattern of sign language by user who is wearing the apparatus 201 for bi-directional sign language/speech translation in real time. The pattern analyzer 202 may analyze the used pattern of sign language including at least one of location information of the user, surrounding environment information of the user corresponding to the location information, a life pattern of the user, or a behavior pattern of the user. The configuration of the pattern analyzer 202 will be described in detail with reference to FIG. 4.

The speech-sign outputter 203 may include a speech recognizer 205, an index generator 206, and a sign outputter 209 to perform an operation of translating a speech into a sign and outputting the sign.

The speech recognizer 205 may recognize a speech through a microphone. Here, the speech recognizer 205 may recognize the speech collected through the microphone included in a body-attached device. In detail, the body-attached device may collect a speech externally made through the microphone, and transfer the collected speech to the speech recognizer 205. The speech recognizer 205 may recognize the speech received from the body-attached device. The speech recognizer 205 may remove noise from the recognized speech.

Here, the speech recognized through the microphone may be a sound externally made, and may include a sound for speech-sign translation and ambient noise. Thus, the speech recognizer 205 may remove the noise included in the speech recognized through the microphone to extract only the speech for speech-sign translation. In an example, the speech recognizer 205 may remove the ambient noise included in the speech. Here, the ambient noise may include all sounds occurring around the user, for example, a subway sound, an automobile horn sound, a step sound, and a music sound.

The speech recognizer 205 may separate a speech of a user other than the user who requests speech-sign translation from the noise-removed speech. In detail, the speech recognized through the microphone may include ambient noise and a speech of a third party located adjacent to the user, as described above. Thus, the speech recognizer 205 may separate the speech of the third party, except for the user, from the noise-removed sound, thereby increasing the speech recognition accuracy for speech-sign translation.

The speech recognizer 205 may generate a speech including only an intrinsic sound of the user who requests translation, by filtering out the ambient noise and the speech of the third party in the speech recognized through the microphone.

The index generator 206 may generate a sign index to translate into the sign corresponding to the speech from which the noise and the speech of the third party are removed. Here, the sign index may be information to be used to generate an image associated with the sign based on the speech of the user. The index generator 206 may include a speech-text converter 207, and an index determiner 208.

The speech-text converter 207 may convert the recognized speech into a text using a predefined sign language dictionary. In detail, the speech-text converter 207 may perform an operation of converting the speech into the text using a text-to-speech (TTS) engine. In this example, the speech may be converted into the text and a sign corresponding to the text may be output since a worldwide sign language dictionary is defined based on a text, and the speech may be converted into the text to transfer, to the user, an image associated with the sign and information with respect to the speech using the text. Further, the sign language dictionary may be used to minimize an amount of data to be transmitted to translate a speech into a sign, thereby improving the speed at which an image associated with the sign is generated.

The index determiner 208 may determine a sign index with respect to the text based on the text and the used pattern of sign language by the user. Here, the index determiner 208 may utilize the text and the used pattern of sign language in which the location information, the surrounding environment information, and the life pattern of the user are analyzed, thereby improving the speed and accuracy for sign language translation. The index determiner 208 may determine the sign index to generate the image associated with the sign through a pre-embedded sign language dictionary based on the speech corresponding to the text. Here, the index determiner 208 may determine the sign index corresponding to the speech based on more generalized information by determining a speech-text-sign index based on the sign language dictionary.

The sign outputter 209 may receive the sign index form the index generator 206, and output the sign corresponding to the speech based on the received sign index. The sign outputter 209 may provide a sign or text corresponding to content of the speech to the user based on the sign index generated based on the speech. The speech outputter 209 may include a display mode controller 210, and an outputter 211.

The display mode controller 210 may control an output based on a display mode to display one of the sign and the text corresponding to the recognized speech. Here, the display mode may include a sign display mode and a text display mode. The display mode controller 210 may select the display mode to display one of the sign and the text corresponding to the speech. In this example, the display mode controller 210 may control the display mode of the outputter 211 based on a sign display event or a generation period of a sign mapped to the sign index.

The display mode controller 210 may transfer, to the outputter 211, the text or the image associated with the sign corresponding to the sign index based on the selected display mode.

The outputter 211 may output the sign mapped to the generated sign index or the text corresponding to the sign mapped to the generated sign index based on the information received based on the display mode selected by the display mode controller 210. In detail, the outputter 211 may represent a speech using a sign which is convenient for a hearing-impaired person, and also display the speech using a text which has a relatively wide expression range when compared to a sign.

The outputter 211 may display the sign or the text corresponding to the speech in view of information expression limitation occurring when the image associated with the sign is output to the user. In detail, the outputter 211 may display the sign translated from the speech through a display of the body-attached device interoperating with the apparatus 201 for bi-directional sign language/speech translation in real time. The outputter 211 may display the image associated with the sign corresponding to the sign index on smart glasses. In this example, the smart glasses are disposed adjacent to eyes of the user. When the image associated with the sign is output, the user may have difficulty in immediately recognizing the image.

Thus, the outputter 211 may represent the speech corresponding to the sign index using the text, and output the text on the smart glasses. In a case in which the speech is represented using the text, the operation of generating the image associated with the sign based on the sign index may be omitted. Thus, information may be transferred faster than the process of transferring information using the image associated with the sign.

Further, the outputter 211 may synchronize the sign or the text with the sign index, thereby alleviating a user inconvenience occurring in the sign language translation process.

Figure 3:
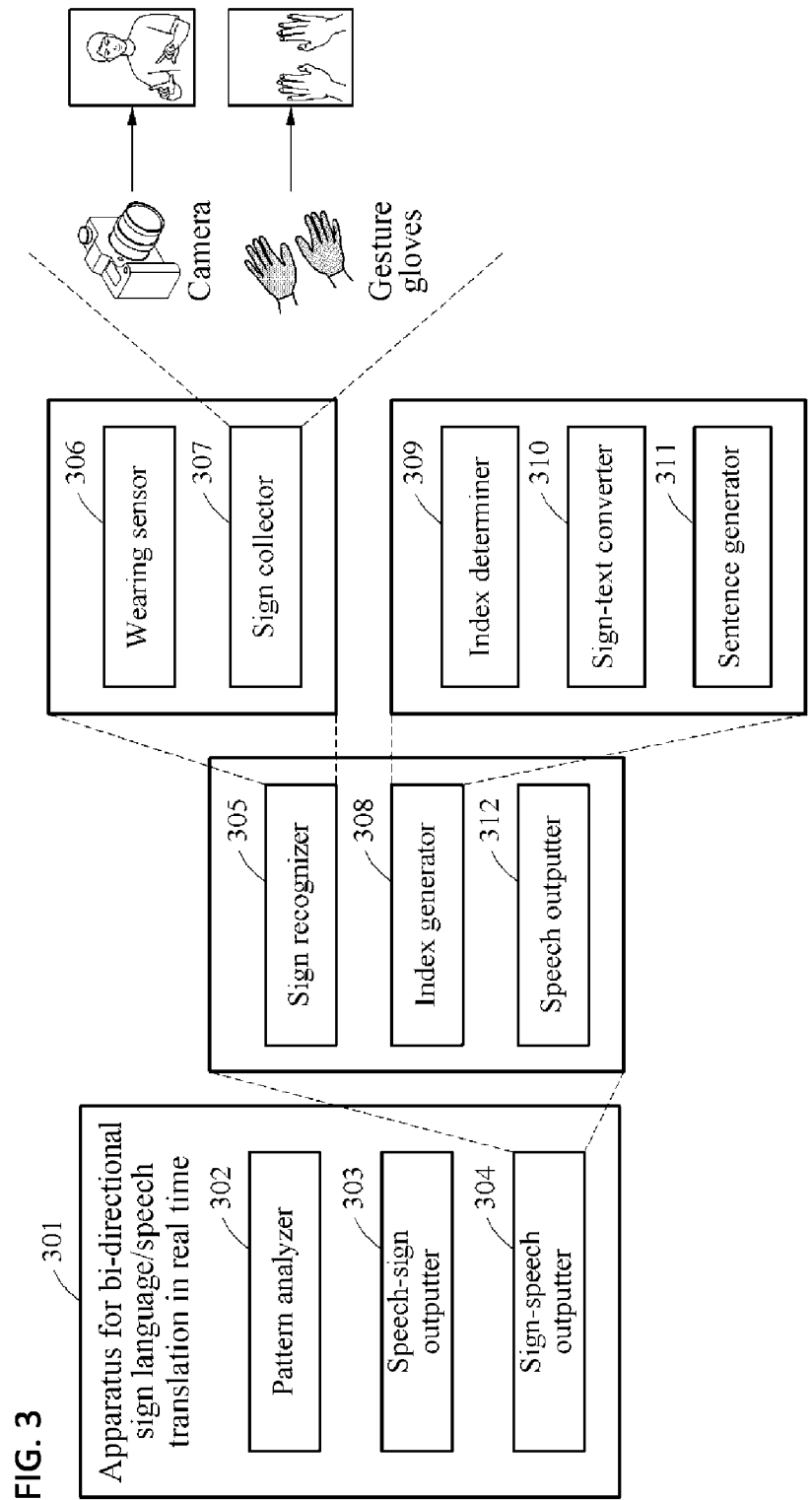
FIG. 3 is a block diagram illustrating a sign-speech outputter in an apparatus for bi-directional sign language/speech translation in real time according to an example embodiment.

FIG. 3 is a block diagram illustrating a sign-speech outputter in an apparatus for bi-directional sign language/speech translation in real time according to an example embodiment.

Referring to FIG. 3, an apparatus 301 for bi-directional sign language/speech translation in real time may include a pattern analyzer 302, a speech-sign outputter 303, and a sign-speech outputter 304. The speech-sign outputter 303 may translate a speech into a sign, and output a result of translation, for example, the sign. The sign-speech outputter 304 may translate a sign into a speech, and output a result of translation, for example, the speech. Hereinafter, a process of translating a sign into a speech and outputting a result of translation, for example, the speech, will be described in detail based on the sign-speech outputter 304.

In detail, the pattern analyzer 302 may analyze a used pattern of sign language by user who is wearing the apparatus 301 for bi-directional sign language/speech translation in real time. The pattern analyzer 302 may analyze the used pattern of sign language including at least one of location information of the user, surrounding environment information of the user corresponding to the location information, a life pattern of the user, or a behavior pattern of the user. The configuration of the pattern analyzer 302 will be described in detail with reference to FIG. 4.

The sign-speech outputter 304 may include a sign recognizer 305, an index generator 308, and a speech outputter 312 to perform an operation of translating a sign into a speech and outputting the speech.

The sign recognizer 305 may recognize a sign through a camera. Here, the sign recognizer 305 may recognize the sign collected through the camera included in a body-attached device. In detail, the body-attached device may collect a sign externally sensed through the camera, and transfer the collected sign to the sign recognizer 305. The sign recognizer 305 may recognize the sign received from the body-attached device.

Here, the sign recognizer 305 may collect the sign from a color image or based on a finger motion, for example, a gesture, of the user depending on a sign collecting scheme. In detail, the sign recognizer 305 may recognize the sign using the color image or the gesture based on whether gesture gloves configured to directly generate a sign are used. Here, the gesture gloves may be a device worn on hands of the user to enable the camera to recognize the gesture of the user. For example, the gesture gloves may include Magic Gloves.

To achieve the foregoing, the sign recognizer 305 may include a wearing sensor 306, and a sign collector 307. The wearing sensor 306 may sense whether the user is wearing the gesture gloves. In this example, the wearing sensor 306 may sense whether the user is wearing the gesture gloves configured to input sign information, to control an operating state of a sign language translation apparatus to recognize a sign.

In detail, in a case in which the user is wearing the gesture gloves to generate sign information and a sign is extracted from the color image, a system overhead may increase, and the speed and accuracy of translation may decrease. Thus, to solve such issues, whether the user is wearing the gesture gloves may be sensed to prevent extraction of a sign from the color image when the user is wearing the gesture gloves.

The sign collector 307 may collect the sign based on whether the user is wearing the gesture gloves. In detail, in a case in which the user is not wearing the gesture gloves, the sign collector 307 may collect the sign by removing a background from the color image acquired by the camera. The sign collector 307 may receive the color image from a depth sensor or an RGB camera. The sign collector 307 may remove unnecessary information which is unrelated to the sign, for example, the background, from the color image. That is, in the case in which the user is not wearing the gesture gloves, the sign collector 307 may collect the sign by extracting information related to the sign from the color image.

Conversely, in a case in which the user is wearing the gesture gloves, the sign collector 307 may collect the sign based on the finger motion of the user collected from the camera. In detail, the sign collector 307 may receive information related to a hand motion or a finger motion of a human using a device such as Magic Gloves. That is, the sign collector 307 may directly collect a gesture of the user as the information related to the sign using the gesture gloves in the case in which the user is wearing the gesture gloves.

The index generator 308 may generate a sign index to translate into the speech corresponding to the recognized sign. To achieve the foregoing, the index generator 308 may include an index determiner 309, a sign-text converter 310, and a sentence generator 311.

The index determiner 309 may determine the sign index with respect to the recognized sign using a predefined sign language dictionary. The index determiner 309 may recognize the sign of the user, and determine the sign index to generate a text using the sign language dictionary stored in a form of a database.

The sign-text converter 310 may convert the sign into a text based on the determined sign index.

The sentence generator 311 may generate a sentence associated with the sign with respect to the text through a keyword combination corresponding to the text and the used pattern of sign language by the user. Here, the sign may have a relatively narrow expression range when compared to a method of expressing using a speech or a text, and thus there is a limitation to expression using a sentence. Thus, to solve such an issue, a function to automatically generate a sentence based on a text may be provided.

In detail, the sentence generator 311 may generate the sentence associated with the sign by performing a keyword combination with everyday conversation sentences stored through the pattern analyzer 302 based on the text generated by the sign-text converter 310. In this example, the sentence generator 311 may predict information to be used for sign-speech translation by analyzing a life pattern of the user, and inputting/analyzing location information and surrounding environment information, thereby guaranteeing the accuracy of translation content and real-time sign-speech translation.

The speech outputter 312 may convert the sentence generated by the sentence generator 311 into a speech, and transfer the speech to the user. In a case of keyword-based operation, the speech outputter 312 may apply a sentence-speech conversion method such as a TTS engine to output the speech corresponding to the sentence. The speech outputter 312 may convert a digital speech generated by the sentence-speech conversion method into an analog speech through digital to audio (D/A) conversion, and output the analog speech to the user.

Here, smart glasses may be used as a body-attached device to transfer translated sign information to the user. In this example, since the smart glasses are a device to be attached to a body, the smart glasses may have a display of a restricted size to transfer sign information. Further, when a text and a sign are projected simultaneously on the display of the smart glasses, the user may experience confusion and fatigue rapidly.

Thus, to solve such issues, a type of information to be projected on the smart glasses, for example, a text or a sign, may be selected based on a user input, for example, a sign or a speech, and a result may be output accordingly.

Also, user convenience-related information, for example, sign information generation speed and period that the user may feel most comfortable with, may be set, and a result may be output accordingly.

Figure 4:
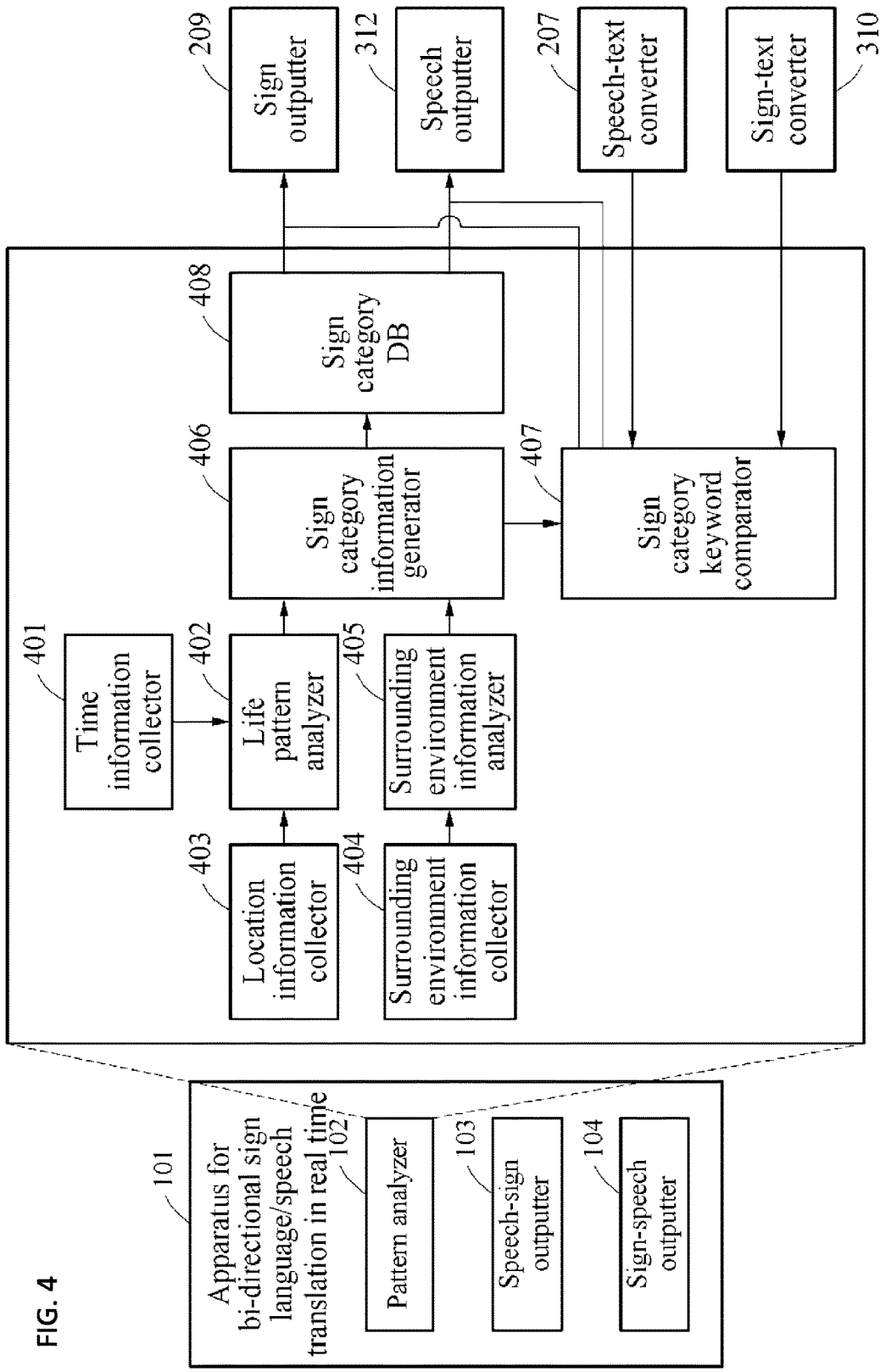
FIG. 4 is a block diagram illustrating an operation of analyzing a used pattern of sign language by user according to an example embodiment.

FIG. 4 is a block diagram illustrating an operation of analyzing a used pattern of sign language by user according to an example embodiment.

Referring to FIG. 4, the pattern analyzer 102 included in the apparatus 101 for bi-directional sign language/speech translation in real time may analyze a used pattern of sign language by user. In general, the user is likely to be in a similar space at a similar time. Herein, the used pattern of sign language by the user may be analyzed in view of spatial/temporal correlation of the user.

In detail, the pattern analyzer 102 may infer a life pattern to be observed in the near future by analyzing a past life pattern of the user. The pattern analyzer 102 may prepare information to be used for sign translation based on a result of inference in advance, thereby increasing the speed of sign translation and guaranteeing real-time sign translation. Further, the pattern analyzer 102 may increase the accuracy of sign translation by correcting an uncertain speech signal based on related information.

To achieve the foregoing, the pattern analyzer 102 may include a time information collector 401, a life pattern analyzer 402, a location information collector 403, a surrounding environment information collector 404, a surrounding environment information analyzer 405, a sign category information generator 406, a sign category keyword comparator 407, and a sign category database (DB) 408.

The life pattern analyzer 402 may accumulate and manage time information input through the time information collector 401 and current location information of the user input through the location information collector 403. The life pattern analyzer 402 may analyze a past behavior pattern of the user based on accumulated information of the time information and the current location information of the user, and infer a life pattern expected to be observed in the near future based on the past behavior pattern.

The surrounding environment information analyzer 405 may infer a type of a current space in which the user is located by analyzing image and sound information of the current space collected from the surrounding environment information collector 404. For example, in a case in which "coffee" is extracted as a keyword by analyzing the image and sound information input from the surrounding environment information collector 404, the surrounding environment information analyzer 405 may infer that the current space corresponds to a café, a coffee shop, or a teahouse.

The sign category information generator 406 may extract a sign information category to be used in the near future by analyzing the past life pattern and the surrounding environment information of the user analyzed by the life pattern analyzer 402 and the surrounding environment information analyzer 405. In detail, in a case in which the user ordered a coffee at a café at the same time in the past and the current surrounding environment information indicates that the user orders a coffee, the sign category information generator 406 may generate a category of ordering a coffee at a café. The generated category information may be transmitted to the sign outputter 209 of FIG. 2 or the speech outputter 312 of FIG. 3 through the sign category DB 408, converted into a speech, a text, or a sign, and transferred to the user or a speaker.

The sign category keyword comparator 407 may perform an operation of solving an issue resulting from an error in a sign category. In detail, in a case in which the user does not show the same behavior pattern all the time and the analyzed surrounding environment information is unclear, a sign category to be inferred may include an error. To solve the issue, the sign category keyword comparator 407 may be provided.

The sign category keyword comparator 407 may compare the information input from the speech-text converter 207 of FIG. 2 or the sign-text converter 310 of FIG. 3 with the inferred sign category information. In a case in which the input information does not match the inferred sign category, the sign category keyword comparator 407 may determine the inferred sign category to be incorrect. The sign category keyword comparator 407 may transmit a signal related to the determination to the sign outputter 209 or the speech outputter 312, and block a speech, a text, or a sign image to be output from the sign category DB 408.

The sign outputter 209 or the speech outputter 312 receiving the signal related to the determination may block the information received from the sign category DB 408, and output information related to at least one of the speech, the text, or the sign.

Here, the information collected from the location information collector 403 and the surrounding environment information collector 404 may be reported continuously through a network connected to the apparatus 101 for bi-directional sign language/speech translation in real time.

Figure 5:
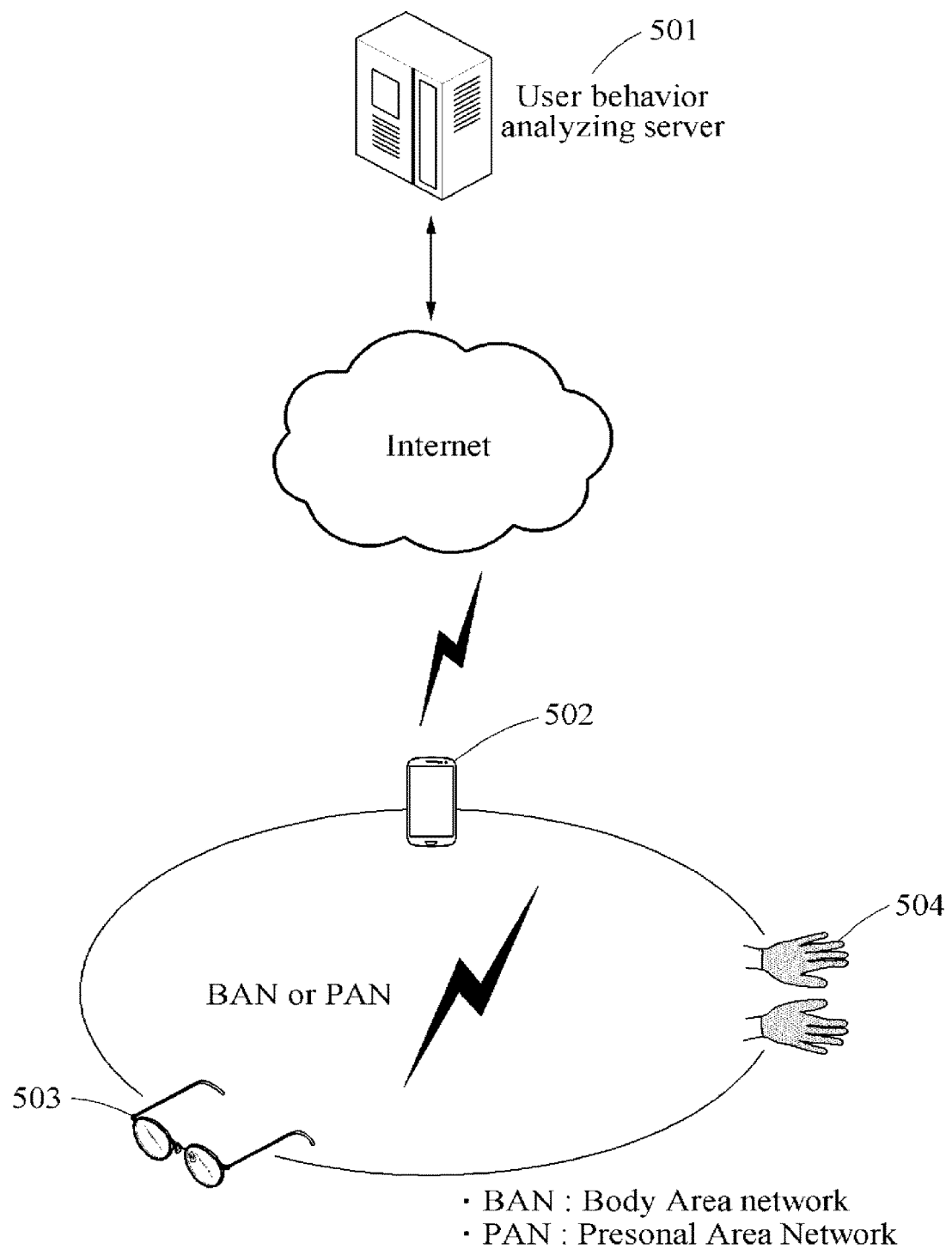
FIG. 5 is a diagram illustrating an operation of an apparatus for bi-directional sign language/speech translation in real time interoperating with a network according to an example embodiment.

FIG. 5 is a diagram illustrating an operation of an apparatus for bi-directional sign language/speech translation in real time connected to a network according to an example embodiment.

Referring to FIG. 5, an apparatus 502 for bi-directional sign language/speech translation in real time may be connected to a network to share information with a user behavior analyzing server 501 which manages image and sound information of a space in which a user is currently located and current location information of the user.

In detail, to perform a method for bi-directional sign language/speech translation in real time, the user behavior analyzing server 501, the apparatus 502 for bi-directional sign language/speech translation in real time, smart glasses 503, and gesture gloves 504 may be provided. The user behavior analyzing server 501, the apparatus 502 for bi-directional sign language/speech translation in real time, the smart glasses 503, and the gesture gloves 504 may be connected to one another through a personal area network (PAN). The apparatus 502 for bi-directional sign language/speech translation in real time, for example, a smart terminal, may form a body area network (BAN) or a PAN with the smart glasses 503 and the gesture gloves 504, for example, body-attached devices. The apparatus 502 for bi-directional sign language/speech translation in real time may be connected to the user behavior analyzing server 501 through the Internet, for example, wired/wireless network.

The user behavior analyzing server 501 may analyze a past behavior pattern of the user, and transmit the analyzed information to the apparatus 502 for bi-directional sign language/speech translation in real time, for example, the smart terminal. Information collected by the location information collector 403 and the surrounding environment information collector 404 of FIG. 4 may be retained in the apparatus 502 for bi-directional sign language/speech translation in real time, for example, the smart terminal, and also transmitted to the user behavior analyzing server 501. In this example, the apparatus 502 for bi-directional sign language/speech translation in real time may not store and analyze a large volume of data due to limited hardware resources such as a memory and a processor.

Thus, a long-term user past behavior analysis may be performed by the user behavior analyzing server 501, and a short-term user past behavior analysis may be performed by the apparatus 502 for bi-directional sign language/speech translation in real time. Past behavior information analyzed by the user behavior analyzing server 501 may vary depending on user settings. However, it may be basically set to transfer user past behavior analysis information corresponding to a day to the apparatus 502 for bi-directional sign language/speech translation in real time.

According to one or more example embodiments, an apparatus for bi-directional sign language/speech translation in real time and method may alleviate an inconvenience that a hearing-impaired person experiences during communication in everyday life, thereby inducing the hearing-impaired person to live a normal social life and reducing a social cost to be used to solve issues caused by hearing impairment.

According to one or more example embodiments, an apparatus for bi-directional sign language/speech translation in real time and method may be applicable to a wide range of environments where normal speech communication is impossible, for example, an environment where military operations are carried out in silence, or an environment in which communication is impossible due to serious noise.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for bi-directional sign language/speech translation in real time comprising:
   a processor; and
   a non-transitory computer readable medium storing program instructions, when executed, causing the processor to:
   analyze a used pattern of sign language by a user in view of current surrounding environment information of the user to generate sign category information via a pattern analyzer;
   recognize a speech externally made through a microphone via a speech-sign outputter and output a sign corresponding to the speech via a display of the speech-sign outputter; and
   recognize a sign sensed through a camera via a sign-speech outputter and output a speech corresponding to the sign via a speaker of the sign-speech outputter,
   wherein the pattern analyzer transmits the sign category information to the speech-sign outputter to output a text or a sign corresponding to the sign category information via the display or to the sign-speech outputter to output a speech corresponding to the sign category information via the speaker,
   wherein the pattern analyzer comprises a sign category keyword comparator configured to compare the sign category information with the sign corresponding to the speech or the speech corresponding to the sign to determine whether the sign category information is correct, and
   wherein the sign category keyword comparator transmits a signal related to whether the sign category information is correct to the speech-sign outputter or the sign-speech outputter to block the text, the sign, or the speech corresponding to the sign category information.

2. The apparatus for bi-directional sign language/speech translation in real time of claim 1, wherein the speech-sign outputter comprises:
   a speech recognizer configured to recognize the speech;
   an index generator configured to generate a sign index to translate into a sign corresponding to the recognized speech; and
   a sign outputter configured to output the sign corresponding to the recognized speech based on the generated sign index.

3. The apparatus for bi-directional sign language/speech translation in real time of claim 2, wherein the index generator comprises:
   a speech-text converter configured to convert the recognized speech into a text using a predefined sign language dictionary; and
   an index determiner configured to determine a sign index with respect to the text based on the text and the used pattern of sign language by the user.

4. The apparatus for bi-directional sign language/speech translation in real time of claim 2, wherein the sign outputter comprises:
   a display mode controller configured to control an output based on a display mode to display one of a sign and a text corresponding to the recognized speech; and
   an outputter configured to output a sign mapped to the generated sign index or a text corresponding to the sign mapped to the generated sign index based on the display mode.

5. The apparatus for bi-directional sign language/speech translation in real time of claim 4, wherein the display mode controller is configured to control the display mode of the outputter based on a sign display event or a generation period of the sign mapped to the sign index.

6. The apparatus for bi-directional sign language/speech translation in real time of claim 5, wherein the outputter is configured to output the sign mapped to the generated sign index or the text corresponding to the sign mapped to the generated sign index on a display of the apparatus for bi-directional sign language/speech translation in real time based on the display mode which is controlled based on the sign display event or the generation period of the sign mapped to the sign index.

7. The apparatus for bi-directional sign language/speech translation in real time of claim 1, wherein the pattern analyzer is configured to analyze the used pattern of sign language by the user by analyzing at least one of location information of the user, surrounding environment information of the user corresponding to the location information, a life pattern of the user, or a behavior pattern of the user.

8. The apparatus for bi-directional sign language/speech translation in real time of claim 1, wherein the sign-speech outputter comprises:
   a sign recognizer configured to recognize the sign sensed through the camera;
   an index generator configured to generate a sign index to translate into the speech corresponding to the recognized sign; and
   a speech outputter configured to output the speech corresponding to the sign based on the generated sign index.

9. The apparatus for bi-directional sign language/speech translation in real time of claim 8, wherein the sign recognizer comprises:
   a wearing sensor configured to sense whether the user is wearing gesture gloves; and
   a sign collector configured to collect the sign based on whether the user is wearing the gesture gloves.

10. The apparatus for bi-directional sign language/speech translation in real time of claim 9, wherein the sign collector is configured to collect the sign by removing a background from a color image acquired by the camera when the user is not wearing the gesture gloves.

11. The apparatus for bi-directional sign language/speech translation in real time of claim 9, wherein the sign collector is configured to collect the sign based on a finger motion of the user collected from the camera when the user is wearing the gesture gloves.

12. The apparatus for bi-directional sign language/speech translation in real time of claim 8, wherein the index generator comprises:
an index determiner configured to determine the sign index with respect to the recognized sign using a predefined sign language dictionary;
a sign-text converter configured to convert the recognized sign to a text based on the determined sign index; and
a sentence generator configured to generate a sentence associated with the sign with respect to the text through a keyword combination corresponding to the text and the used pattern of sign language by the user.

13. The apparatus for bi-directional sign language/speech translation in real time of claim 12, wherein the speech outputter is configured to output a speech corresponding to the sentence associated with the sign with respect to the text.

14. A method for bi-directional sign language/speech translation in real time performed by an apparatus for bi-directional sign language/speech translation in real time, the method comprising:
analyzing a used pattern of sign language by a user who uses the apparatus for bi-directional sign language/speech translation in real time in view of current surrounding environment information of the user to generate a sign category information;
recognizing a first sign or a first speech externally made by the user through a camera or a microphone, respectively;
identifying a second sign corresponding to the first speech or a second speech corresponding to the first sign using the sign category information; and
outputting the second sign or the second speech through a different translation path based on a result of the identifying,
wherein the analyzing comprises:
comparing the sign category information with the second sign corresponding to the first speech or the second speech corresponding to the first sign to determine whether the sign category information is correct, and
transmitting a signal related to whether the sign category information is correct to the speech-sign outputter or the sign-speech outputter to block the second sign or the second speech corresponding to the sign category information.

15. The method for bi-directional sign language/speech translation in real time of claim 14, wherein the outputting the second sign or the second speech comprises:
generating a sign index to translate into the second sign corresponding to the recognized first speech; and
outputting the second sign corresponding to the recognized first speech based on the generated sign index.

16. The method for bi-directional sign language/speech translation in real time of claim 15, wherein the generating comprises:
converting the recognized first speech into a text using a predefined sign language dictionary; and
determining a sign index with respect to the text based on the text and the used pattern of sign language by the user.

17. The method for bi-directional sign language/speech translation in real time of claim 15, wherein the outputting of the second sign corresponding to the recognized first speech comprises:
controlling whether to display a sign or a text based on a display mode to display one of a sign and a text corresponding to the recognized first speech; and
outputting a sign mapped to the generated sign index or a text corresponding to the sign mapped to the generated sign index based on the display mode.

18. The method for bi-directional sign language/speech translation in real time of claim 14, wherein the outputting the second sign or the second speech comprises:
recognizing the first sign externally made by the user;
generating a sign index to translate into the second speech corresponding to the recognized first sign; and
outputting the second speech corresponding to the recognized first sign based on the generated sign index.

19. The method for bi-directional sign language/speech translation in real time of claim 18, wherein the recognizing comprises:
sensing whether the user is wearing gesture gloves; and
collecting the first sign based on whether the user is wearing the gesture gloves.

20. The method for bi-directional sign language/speech translation in real time of claim 18, wherein the generating comprises:
determining the sign index with respect to the recognized first sign using a predefined sign language dictionary;
converting the recognized first sign to a text based on the determined sign index; and
generating a sentence associated with the first sign with respect to the text through a keyword combination corresponding to the text and the used pattern of sign language by the user.

* * * * *